United States Patent [19]

Muchel

[11] Patent Number: 4,606,617
[45] Date of Patent: Aug. 19, 1986

[54] ADAPTER FOR ILLUMINATION OR LASER RADIATION FOR SURGICAL MICROSCOPES

[75] Inventor: Franz Muchel, Königsbronn, Fed. Rep. of Germany

[73] Assignee: Carl-Zeiss-Stiftung, Heidenheim on the Brenz, Fed. Rep. of Germany

[21] Appl. No.: 656,445

[22] Filed: Oct. 1, 1984

[30] Foreign Application Priority Data

Oct. 5, 1983 [DE] Fed. Rep. of Germany ....... 3336125

[51] Int. Cl.$^4$ ............................................ G02B 21/06
[52] U.S. Cl. .................................................. 350/527
[58] Field of Search ............... 350/515, 523, 528, 513, 350/514, 511, 516

[56] References Cited

U.S. PATENT DOCUMENTS

| | | | |
|---|---|---|---|
| 2,406,526 | 8/1946 | Bennett et al. | 350/515 |
| 3,796,220 | 3/1974 | Bredemeier | 350/516 |
| 4,232,933 | 11/1980 | Nakahashi | 350/523 |
| 4,518,231 | 5/1985 | Muchel et al. | 350/516 |

Primary Examiner—John K. Corbin
Assistant Examiner—Vincent J. Lemmo
Attorney, Agent, or Firm—Stonebraker, Shepard & Stephens

[57] ABSTRACT

An adapter which may be employed in place of the main objective of a surgical microscope or other stereoscopic viewing microscope. The adapter housing contains two viewing objectives laterally separated from each other to define separate right-eye and left-eye viewing ray paths, and a separate illumination ray objective. A mirror behind this third objective deflects beams or rays of incoming illuminating light or laser radiation, coming from any appropriate source, so that it will pass through the third objective toward the object being viewed. The mirror is mounted for tilting movement in all directions, so that it may receive and properly direct light beams or laser radiation coming in from any appropriate direction. Prisms behind the two viewing objectives narrow the spacing of the two observation ray paths (e.g., to normal interpupillary distance) although the centers of the two observation objectives may be at a greater distance from each other, to provide a larger stereoscopic base.

2 Claims, 2 Drawing Figures

ADAPTER FOR ILLUMINATION OR LASER RADIATION FOR SURGICAL MICROSCOPES

The present invention relates to an adapter for surgical microscopes or operation microscopes, to eliminate or reduce the troublesome and disturbing reflections which often occur, caused by reflection of illuminating rays or laser radiation rays.

In surgical microscopes, the reflecting of the illuminating rays into the microscope usually takes place between the main objective of the observation ray path and the microscope base. Such an instrument is shown, for instance, in the "Handbuch für Augenoptik" (Handbook of Ophthalmic Optics) published by the Carl Zeiss firm of Oberkochen, West Germany.

With the increasing demands being made on surgical microscopes, instances may arise in which the reflections produced by this conventional type of reflecting-in of the illuminating rays are undesirable. Especially if laser beams are reflected into the microscope in the manner described, and directed through the microscope into an object for therapeutic purposes, the reflections produced may be disturbing.

The object of the invention is to provide apparatus for the reflecting of observation light beams or laser beams into surgical microscopes in a way in which no disturbing reflections occur.

According to the invention, this object is achieved by providing two separate objectives for the two observation ray paths, and a third objective for the path of the illuminating rays or laser rays, the three objectives being mounted in a housing which can be mounted on the microscope base in place of the conventional main objective of the microscope. In addition, a mirror which can be tilted in all directions is provided behind the objective used for the illuminating rays or laser rays (that is, on the opposite side of this objective from the object) so that the rays to be introduced into the microscope may be directed from the illuminating source or the laser source to this mirror, and may be reflected thereby to pass along an axis through the third objective and to the object.

One advantage of the invention is that it achieves a decoupling of the illumination ray path or laser beam path from the observation ray path. As a result, occurrence of disturbing reflections in the observation ray path is prevented. Also, since a separate or third objective is used for the illuminating rays and/or laser rays, this objective can be optimally corrected according to the wavelengths used for the illumination rays or the laser rays. Furthermore, the illumination or laser ray objective can be removed and replaced by another one (e.g., one corrected for a different wavelength) without affecting the observation ray path.

Another favorable effect of the invention is that, as a result of using two separate observation objectives, the stereoscopic base is widened, which is favorable particularly in the case of objectives of long focal length.

One advantageous embodiment of the invention is illustrated in the drawing and will be described in detail below.

DESCRIPTION OF THE PREFERRED EMBODIMENT

Figure 1:
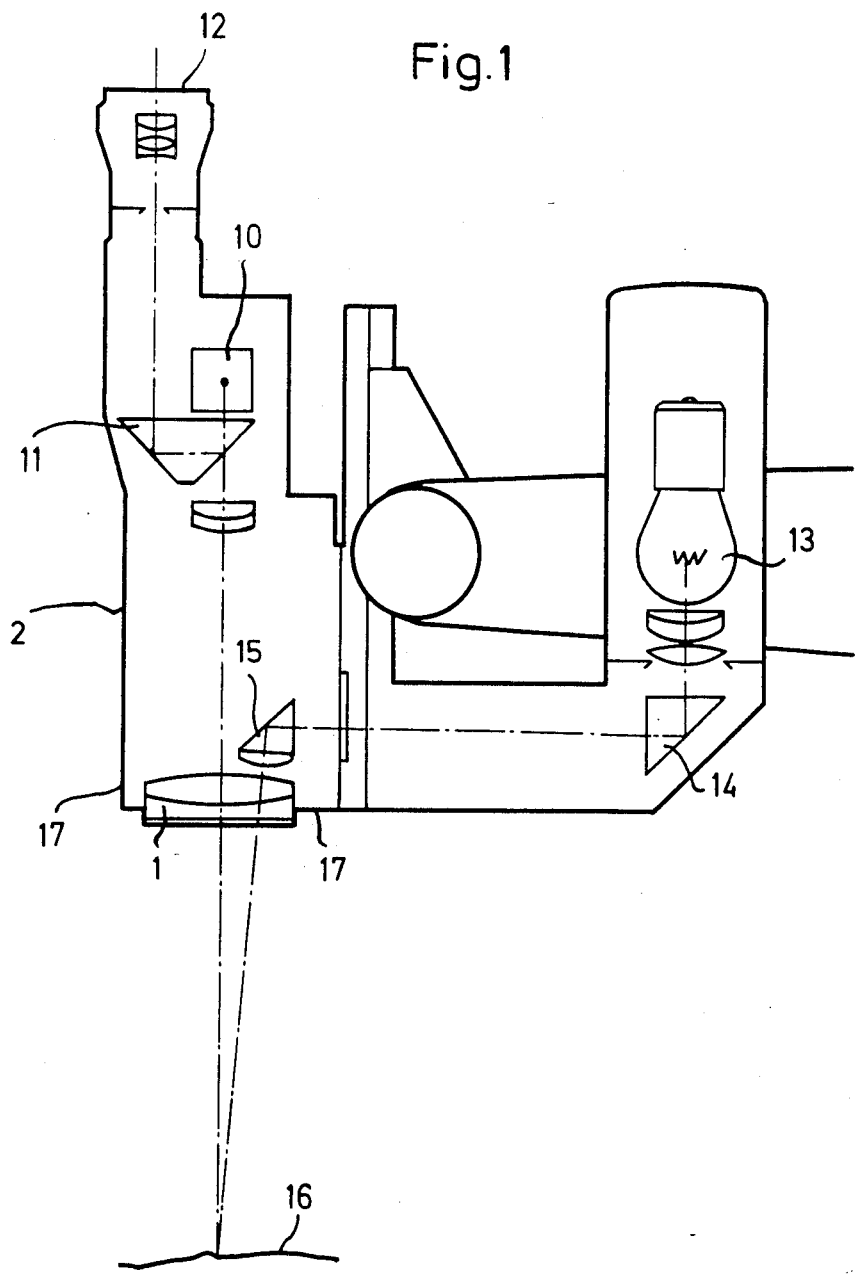
FIG. 1 is a diagrammatic vertical section taken centrally through a conventional surgical microscope, seen from the side.

Referring first to FIG. 1, a conventional surgical microscope of the kind with which the adapter of the present invention may be used includes the main objective 1 mounted at the lower end of the main body portion 2. Illumination rays from the light source 13 are deflected by the prism 14 to the prism 15 which is loacted above the main objective 1. This prism again deflects the illumination rays to pass downwardly through the main objective 1 to the object 16. Observation rays coming from the object 16 pass upwardly through the main objective 1 and are deflected by the prism combination 10, 11 into the binocular eyepiece 12, conventionally having two eyepiece tubes for the two eyes of the observer. Only one shows in FIG. 1, as the other is behind it and hidden, in this direction of viewing.

Figure 2:
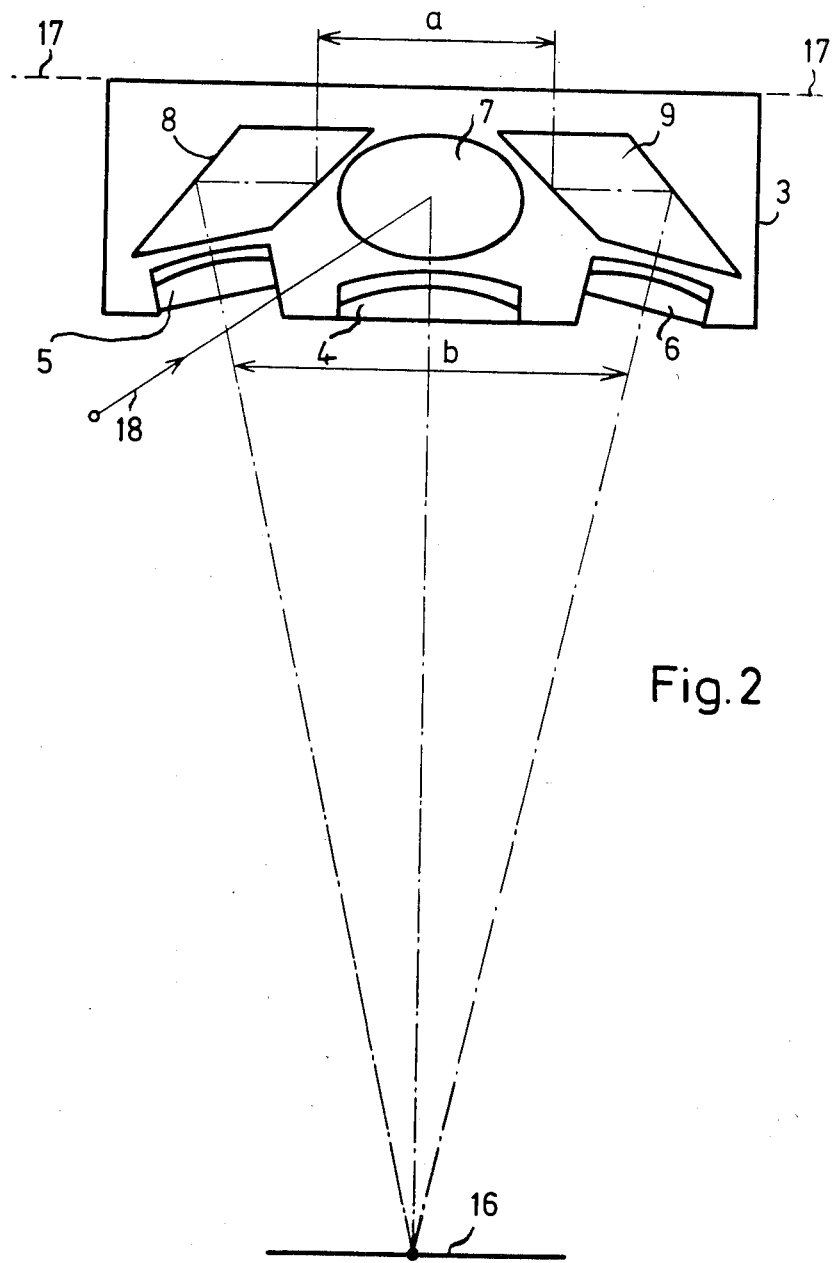
FIG. 2 is a vertical section through one embodiment of an adapter according to the present invention, seen diagrammatically from the front.

FIG. 2 illustrates the adapter of the present invention. It has a body of housing 3 which may be connected by any suitable known form of connection to the portion 17 (FIG. 1) of the microscope body in place of the conventional objective 1, which is removed.

In this adapter housing 3 there are a central objective 4 for the illumination beam or laser beam, and objectives 5 and 6 on opposite sides of the objective 4, for the observation beams. These provide a stereoscopic ray path. Behind the observation objectives 5 and 6 there are prisms 8 and 9, respectively, which deflect the observation rays into the associated eyepieces of the microscope. Thus the normal stereoscopic base of the microscope, indicated at a, is widened to the enlarged steroscopic base indicated at b.

A mirror 7 is mounted behind the objective 4, and is tiltable or adjustable in all directions, so as to be able to receive and reflect illuminating rays or laser radiation rays incoming from any convenient direction. Such rays, indicated schematically by the line 18, impinge on the mirror 7 and are reflected thereby to pass downwardly through the objective 4 to the object 16.

Although the invention is especially useful for surgical or operation microscopes, it may be employed advantageously with all types of stereomicroscopes.

What is claimed is:

1. An adapter for use on a stereoscopic microscope of the type having two observation ray paths spaced laterally from each other at a spacing constituting a normal stereo base dimension, said adapter comprising a housing adapted to be mounted on said microscope in place of a conventional main objective of the microscope, two observation objectives mounted in said housing in laterally space relation to each other to provide two paths for observation rays for stereoscopic viewing of an object, said observation objectives having their centers spaced from each other by a distance substantially greater than said normal base dimension to provide a greater than normal stereoscopic viewing base, an illumination objective also mounted in said housing approximately between said two observation objectives to provide a ray path for illuminating rays, reflecting means in said housing in position to deflect incoming illuminating rays to cause such rays to pass through said illumination objective toward said object being viewed, and two deflection prisms, one located respectively behind each of said observation objectives, as seen in a direction from said object toward an observer using the microscope, said prisms serving to deflect said observation rays so that as they travel from an object toward an observer and pass through said observation objectives at a lateral spacing corresponding to said greater than normal base, said prisms will deflect said rays to bring them closer to each other substantially to said normal base dimension, so that said rays may continue along the observation ray paths of the microscope on which said adapter housing is mounted.

2. An adapter for mounting on a conventional stereomicroscope as a replacement for a conventional objective of such conventional stereomicroscope, to provide a larger stereo viewing base as well as a separation of illuminating ray paths from observation ray paths for a reduction of disturbing reflections, said adapter comprising a housing, two observation objectives mounted in said housing laterally spaced from each other at a distance substantially greater than a conventional stereoscopic viewing base of the microscope with which said adapter is used, an illumination objective mounted in said housing approximately between said two observation objectives, reflecting means mounted in said housing behind said illumination objective in position to receive an incoming illumination beam and reflect said beam to said observation objective to pass therethrough toward an object being viewed, and two reflecting prisms mounted in said housing, one behind each of said observation objectives, to reflect respective observation rays coming from said object being viewed to and through said respective observation objectives to said respective prisms, to bring said observation rays closer together to a spacing substantially equal to said conventional stereoscopic viewing base of the microscope with which said adapter is used.

* * * * *